April 14, 1959 — A. R. TOBIAS — 2,882,081
SEAL
Filed Nov. 15, 1956
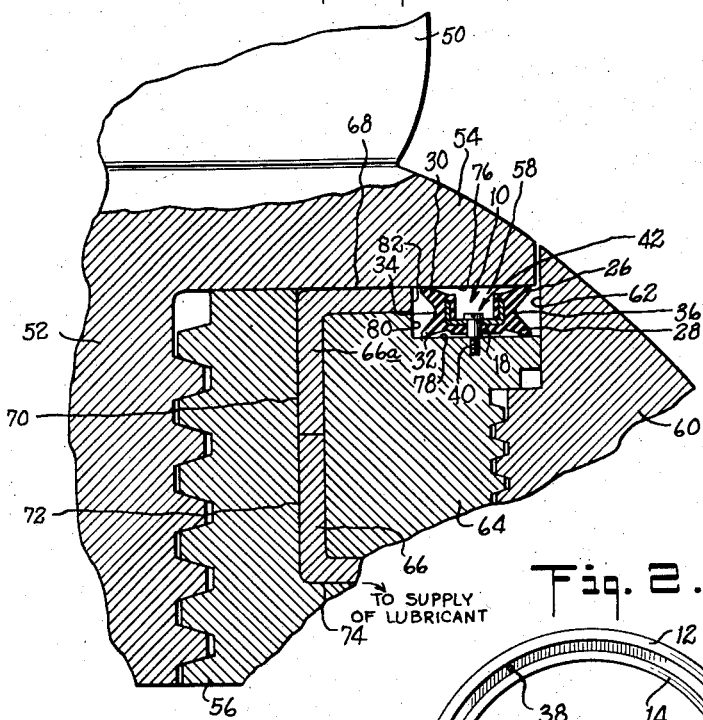
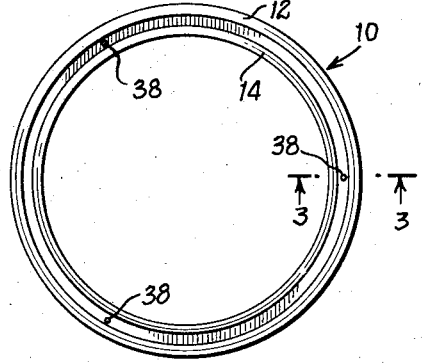
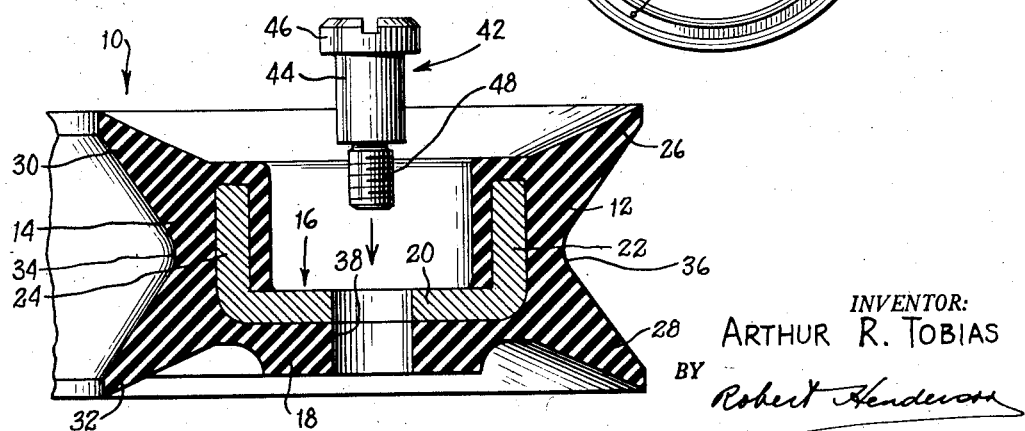
INVENTOR:
ARTHUR R. TOBIAS
BY Robert Henderson
ATTORNEY

United States Patent Office 2,882,081
Patented Apr. 14, 1959

2,882,081

SEAL

Arthur R. Tobias, Palmyra, N.Y., assignor to The Garlock Packing Company, Palmyra, N.Y., a corporation of New York Application November 15, 1956, Serial No. 622,383

2 Claims. (Cl. 288—2)

This invention relates to an improved seal for preventing material fluid leakage between two relatively rotatable parts. It is particularly well suited for preventing different fluids at different portions of the seal from moving past the seal to opposite portions thereof. It is, therefore, illustrated and described herein as embodied in a propeller hub wherein portions thereof are relatively rotatable to cause changes in the pitch of the propeller while separating or isolating lubricant within the hub from water, air or other fluid surrounding the hub. The invention, however, is not to be considered as limited to the particular disclosed embodiment which, of course, is selected only for illustrative purposes.

An important object of the invention is the provision of an improved seal which, although of relatively large diameter and circumference, requires only a minimum number of screws or equivalent means for holding the seal in a desired position in the mechanism which it seals, thereby facilitating installation of the seal and its removal for servicing or replacement.

Another important object is the provision of a seal including improved means by which excessive axial shifting of the seal is prevented in use, thereby minimizing wear of sealing lips at opposite sides of the seal and assuring more perfect functioning of such lips.

Another important object is the provision of a seal wherein separate pairs of sealing lips are provided for sealing fluid at opposite portions of the seal and wherein a metal reinforcing member is provided which contributes materially to the holding of the seal in place and also has separate flanges for supporting said separate pairs of sealing lips.

The foregoing and other more or less obvious objects are accomplished by this invention.

In the drawing:

Figure 1 is a largely sectional fragmentary view of a propeller and its hub with a seal therein according to this invention, the seal being shown in section.

Fig. 2 is a considerably reduced plan view of said seal.

Fig. 3 is a considerably enlarged cross-sectional view of the seal; the section being on the line 3—3 of Fig. 2.

In Fig. 1, the seal is shown somewhat compressed axially as in service and, in Fig. 3, it appears in its non-compressed or non-flexed state as manufactured.

It may be seen that the seal, as a whole, is an annulus 10 comprising an outer, annular, flexible sealing member 12, an inner, annular, flexible sealing member 14, both of relatively soft rubber or other suitable soft rubber-like material (all such materials being hereinafter comprehended within the term "rubber"). The sealing members 12 and 14 are joined by a unifying portion which, as shown, comprises a rigid, metal, annular reinforcing member 16 of channel shape in cross-section, and an annular, rubber web 18 which is homogeneously integral with members 12 and 14.

The reinforcing member 16 has a flat web 20, an outer, circular, axial flange 22, preferably embedded in a base portion of the sealing member 12 for supporting the latter and an inner, circular, axial flange 24, preferably embedded in a base portion of the sealing member 14 for supporting the latter. The rubber part of the seal, ordinarily, would be molded to shape and cured in the one operation; and the reinforcing member 16 would be embedded in the rubber in the same molding and curing operation.

Sealing lips 26 and 28 extend radially outwardly and axially outwardly from opposite sides of sealing member 12, and sealing lips 30 and 32 extend radially inwardly and axially outwardly from opposite sides of sealing member 14. The web 18 is of such thickness that its flat exposed surface, in the non-flexed condition of the seal, is inward, in an axial direction, in relation to a plane coincident with the axially outermost edges of the lips 28 and 32.

Fig. 1 illustrates the manner in which the seal is used and functions in the hub of a variable pitch propeller. It shows a propeller blade 50 having an integral stem 52 of less diameter than a blade base 54, and on said stem is threaded a retention ring 56. The stem 52 and ring 56 extend within a circular recess 58 in a hub member 60, the side wall of said recess being indicated at 62.

Another retention ring, numbered 64, is threaded into hub member 60 and overlies ring 56, thereby holding the propeller in association with the hub member. Mounted within the ring 64 is a two-piece bearing 66, 66a. The association of the described parts as when in use is such that the bearing 66, 66a and retention ring 64 are immovable in relation to hub member 60, and that blade 50, stem 52 and ring 56, which are non-rotatable in relation to each other, turn back and forth to a limited extent within the bearing 66, 66a when the pitch of the blade 50 is undergoing change.

Thus, sliding bearing surfaces require lubrication at 68, 70, 72 and 74. Suitable fluid lubricant is supplied to the just-mentioned areas from a suitable supply source which is not shown but is indicated by a suitable legend. The seal 10 is located in an annular seal space defined by a flat annular palm surface 76 of the blade base 54, an opposed, flat, annular surface 78 of the ring 64, cylindrical surfaces 80, 82 of ring 64 and bearing part 66a, and the circular wall 62. In the stated location the seal opposes escape of lubricant outwardly (or i.e., rightwardly as viewed in Fig. 1) and opposes inward or leftward movement of water which, with a marine propeller, surrounds the latter and its hub.

The distance between the flat surfaces 76 and 78 is less than the over-all side-to-side thickness of the annulus 10 when the latter is in its non-compressed or non-flexed state so that, when the seal is in service, the sealing lips 26 and 30, respectively, are flexed toward sealing lips 28 and 32, and vice versa. In that condition the reaction arising from the resiliency of said lips causes them to remain continuously in sealing association with the flat surfaces 76 and 78.

The over-all radial thickness of the annulus 10 is materially less than the distance, radially, between cylindrical surfaces 62 and 80, 82, and the circumferential dimension of said annulus is such that when the latter is located concentrically within the seal space it is substantially clear of said cylindrical surfaces. Thus, any fluid pressure present in the lubricant is effective within an inner annular groove 34 between lips 30 and 32 to urge said lips respectively, toward surfaces 76 and 78; and the pressure of the water within an outer annular groove 36 between lips 26 and 28 urges said lips, respectively, toward surfaces 76 and 78. In this way, the fluid pressures exerted upon the seal aid the resiliency of the sealing lips to maintain the latter continuously in firm sealing engagement with surfaces 76 and 78.

It may be feasible to utilize the seal in the manner described without anchoring it in place in the seal space but such anchoring is preferred. For that purpose, the seal is formed with a few bored, screw holes 38, three such holes being sufficient as shown in the drawing. The holes extend axially through central lines of rubber web 18 and web 20 of the metal reinforcing member. Mating, threaded screw holes 40 are provided in ring 64. Screws 42 are provided as best illustrated in detail in Fig. 3. A screw 42 has a shank 44, slightly less in diameter than screw hole 38, greater in diameter than screw hole 40 and slightly longer than the combined thicknesses of webs 18 and 20. The screw also has a head 46 which limits insertion of the screw into hole 38 and a reduced threaded end 48 which threads into hole 40.

The described screw arrangement suffices to fix the seal to ring 64 without clamping it thereto and permits a slight shifting of the seal longitudinally of the screws so that the seal may be said to float in the seal space. If desired, however, the screws may be such as to clamp the seal lightly rather than tightly upon the ring 64. Tight clamping preferably should be avoided as it might induce objectionable warping of the seal.

It may be seen that, in the arrangement illustrated and described, the flat, exposed surface of web 18 is clear of or only in light contact with surface 78, that the web 18 prohibits excessive flexing of lips 28 and 32, and screw head 46 prohibits excessive flexing of lips 26 and 30. In other words, the described seal-mounting arrangement effectively centers the seal between the flat surfaces 76 and 78. The seal effects a substantially static seal with ring 64 and, when the pitch of the propeller is being altered, it effects a sliding seal with flat surface 76 of the propeller blade base.

It will readily be realized that the present inventive concept may be utilized in various other forms without, however, departing from the invention as set forth in the following claims.

I claim:

1. The combination in an annular seal comprising an outer, annular, flexible sealing member having a pair of outer, axially flexible sealing lips extending radially outwardly and axially outwardly from opposite sides of said outer sealing member and defining an intervening outer annular groove, an inner, annular, flexible sealing member having a pair of inner, axially flexible sealing lips extending radially inwardly and axially outwardly from opposite sides of said inner sealing member in approximate, radial alignment with the sealing lips of the outer sealing member and defining an intervening inner annular groove, a rigid, annular portion unifying said inner and outer sealing members, said unifying portion having a flat, side face, in radial alignment with a portion on each of the side faces of the sealing lips at one side of the seal whereby said flat, side face acts to limit the axially inward flexing of the latter lips, the combination further including plural screws for holding the seal with said flat, side face in face-to-face relationship with a flat surface of an adjacent member to be sealed; the said unifying portion having axially extending bores therethrough, opening at said flat face, to receive said screws and the latter each having a threaded portion at one end threadable into said adjacent member, an intermediate portion thicker than said threaded portion to limit such threading into said adjacent member, and a head, at the other end of the screw, of a thickness greater than the related bore; the said intermediate portion being thinner and longer than the related bore whereby to avoid tight clamping of said unifying portion to said adjacent member.

2. The combination in an annular seal of an outer, annular, flexible sealing member having a pair of outer, axially flexible sealing lips extending radially outwardly and axially outwardly from opposite sides of said outer sealing member and defining an intervening outer annular groove, an inner, annular, flexible sealing member having a pair of inner, axially flexible sealing lips extending radially inwardly and axially outwardly from opposite sides of said inner sealing member in approximate, radial alignment with the sealing lips of the outer sealing member and defining an intervening inner annular groove, a rigid, annular portion unifying said inner and outer sealing members, said unifying portion having a flat, side face in radial alignment with a portion on each of the side faces of the sealing lips at one side of the seal whereby said flat, side face acts to limit the axially inward flexing of the latter lips, the combination further including a rigid, metal, annular reinforcing member of channel shape in cross-section, fixedly associated with said unifying portion with its channel opening toward the side of the seal opposite to said flat, side face; the reinforcing member having an outer axial flange underlying and supporting said outer sealing lips and an inner axial flange underlying and supporting said inner sealing lips.

References Cited in the file of this patent

UNITED STATES PATENTS

| | | |
|---|---|---|
| 2,647,002 | Brummer | July 28, 1953 |
| 2,665,149 | Schmidt | Jan. 5, 1954 |
| 2,676,041 | Englesson | Apr. 20, 1954 |
| 2,841,429 | McCuistion | July 1, 1958 |

FOREIGN PATENTS

| | | |
|---|---|---|
| 1,034,215 | France | Apr. 8, 1953 |